Jan. 17, 1928.  
S. A. KORNSWEET  
MOLDING APPARATUS  
Filed Oct. 17, 1922  
1,656,523
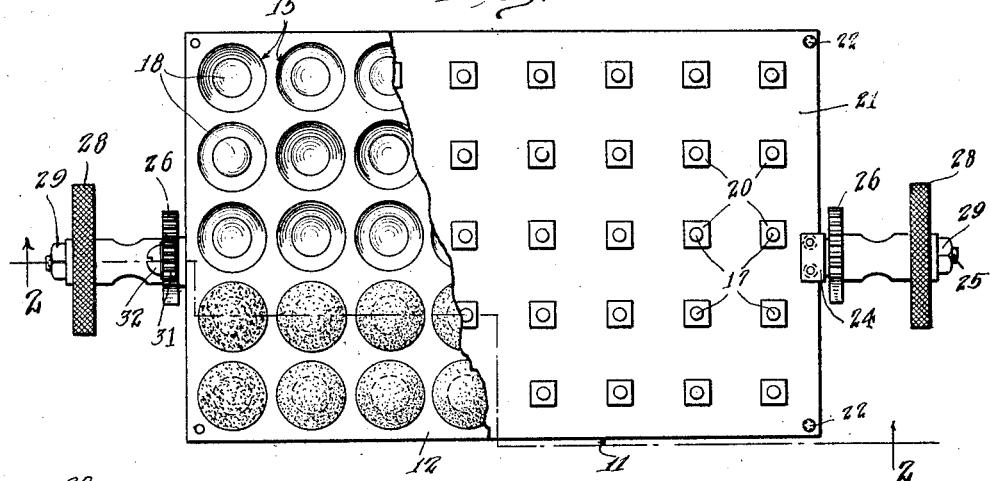
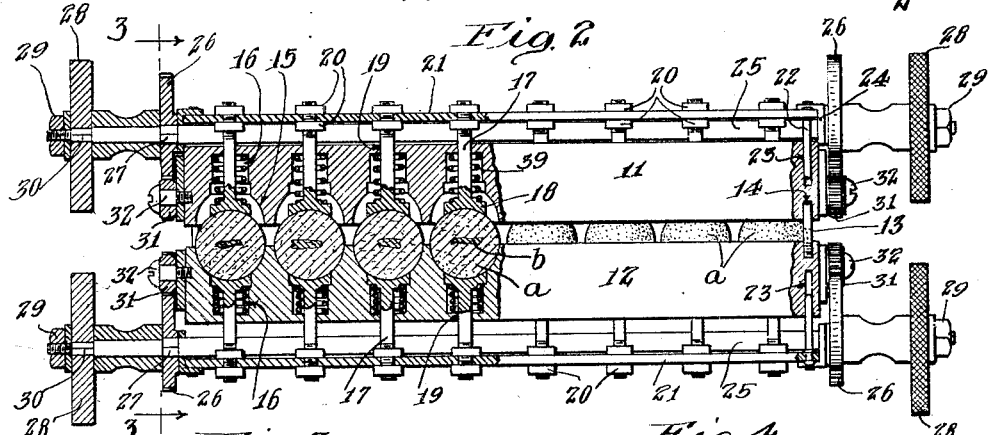
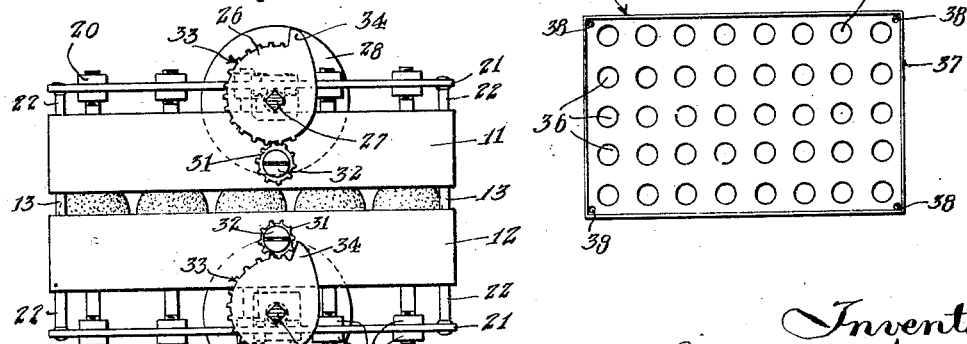
Inventor  
Samuel A. Kornsweet  
By Lyon & Lyon  
Attys Patented Jan. 17, 1928.

1,656,523

UNITED STATES PATENT OFFICE.

SAMUEL A. KORNSWEET, OF LOS ANGELES, CALIFORNIA.

MOLDING APPARATUS.

Application filed October 17, 1922. Serial No. 595,110.

This invention relates to a molding apparatus capable of being used for molding frozen dainties.

An object of the invention is to mold ice cream in a convenient form for dispensing to the consumer.

Another object is to provide molded frozen dainties having a center or layer of fruit, nuts or other edible filling.

The accompanying drawings illustrate the invention:

Figure 1 is a plan view of an apparatus embodying the invention, the upper section being partially broken away and molded articles being shown in some of the cups of the lower section.

Fig. 2 is an elevation partly in section on the line indicated by 2—2, Figure 1, the plungers of the upper section being in position to eject the upper molded sections of the molded articles from the cups of the upper section.

Fig. 3 is an elevation from the line indicated by 3—3, Fig. 2, the shafts being in section.

Fig. 4 is a plan view of the perforate member employed for forming a layer or center of fruit, nuts or other filling upon the upper faces of the lower sections of the molded articles.

Fig. 5 is a sectional detail of one of the cups of the lower section and its plunger, a fragment of the perforate member being shown in position for applying a filling to the upper face of the section of ice cream in the cup.

Fig. 6 is a view of one of the frozen dainties molded in the apparatus.

There are provided two identically constructed mold sections 11, 12. For convenience in describing the operation of the apparatus, the section 11 will be termed the upper section and the section 12 the lower section. The sections 11, 12 are held in spaced relation by posts 13 screw-threaded into the upper face of the lower section near the corners thereof and detachably seated in sockets 14 in the lower face of the upper section 11. It is not absolutely necessary to so space the sections, but it is preferred to do so.

The sections 11, 12, are provided with concavities or cups 15, each concavity being approximately hemispherical. Communicating with the cups 15 are spring chambers 16 containing coil springs 39 which surround plungers 17 that extend through the spring chambers and that are adapted to be projected by the springs into the cups. The plungers 17 are enlarged to form heads 18 and, when the plungers are retracted, the heads 18 fit in the spring chambers. The outer faces of the heads 18 are concave so as to constitute a continuation of the walls of the cups, when the heads are retracted within the spring chambers.

The stems of the plungers 17 pass through holes 19 in the sections and project from said sections through an operating member 21 and are connected by nuts 20 to said operating member. The operating member 21, in the instance shown, comprises a plate provided near its corners with guides 22 which work in ways 23 in the sections.

The plates 21 are provided at their opposite ends with bearings 24 for shafts 25, there being a shaft for each section. The shafts extend lengthwise of the sections near the middle thereof and project beyond the ends of the sections. Each shaft is provided with a cam 26 secured, in this instance, to the shaft by fitting on a seat 27 of angular cross section. Each of the shafts 25 is provided at its opposite ends with operating knobs 28 which are secured to the shaft by nuts 29. The knobs 28 are held against turning relative to the shafts by reason of the knobs fitting angular seats 30 on the shafts. The cams 26 are preferably toothed, as shown, and they engage followers in the form of spur pinions 31 rotatably mounted on studs 32 which are screw-threaded into the ends of the sections 11, 12.

From the foregoing it will be readily understood that, to retract the plungers against the pressure of the springs 39, it is only necessary for the operator to rotate the knobs 28 so as to cause the larger radii portions 33 of the cams to engage the pinions 31 so as to force the plates 21 away from the sections 11, 12. The cams 26 are preferably provided at their peripheries with shoulders 34 adapted to engage the pinions when the portions 33 of the cams engage said pinions, thus limiting rotation of the cams in one direction.

In Figure 4 is shown a perforate member 35, the perforations, circular in this instance, being indicated at 36. In this particular instance the member 35 is provided at its margins with flanges 37 so that it constitutes a tray.

The member 35 is provided near its corners with holes or ways 38 adapted, when the upper section 11 of the mold is detached from the lower section, to engage the posts 13 so as to center the perforations 36 with respect to the cups 15. It is to be understood that the perforations 36 may be of any diameter that may be desired. For example, the diameter of the perforations may be as great as the diameter of the cups, or the diameter of said perforations may be less than the diameter of the cups, as shown in Figure 5.

The operations involved in molding frozen dainties according to this invention are as follows:

The plungers of both mold sections will be retracted by operating the knobs 28, as above explained, and the section 12 will be placed on a suitable support. Then the operator will apply ice cream or the like to the upper face of the section 12, pressing the ice cream firmly into the cups of said section, as indicated at $a$ in Figs. 2 and 5. The upper face of the section 12 will then be scraped comparatively free of ice cream and the perforate member 35 will be placed in position on the posts 13. Then any desired moldable filling, indicated at $b$ in Figs. 2 and 5, as, for example, fruit or fruit and nuts, will be placed on the member 35 and pressed or rubbed, by the use of a suitable implement, through the perforations 36. This of course molds and presses the filling into the upper surface of the hemispherical sections of ice cream in the cups. After this operation the member 35 will be lifted from the posts 13.

It is to be understood that, if the filling is not desired, the last described operation will be omitted.

The cups of the mold section 11 will then be filled with ice cream the same as above described for the mold section 12. Then the mold section 11 will be inverted and seated on the post 13 in the manner clearly shown in Figure 2. This brings the cups of the section 11 directly over the cups of the section 12. The operator now turns the knobs 28 of the upper section to permit the springs to project the plungers into the cups, as in Fig. 2, thus thrusting the molded sections of ice cream from the upper cups into contact with the molded ice cream in the lower cups and making frozen dainties in the shape of balls or spheres of ice cream, or the like, having a layer or center of a suitable filling of nuts, fruit or the like.

The operator will then lift the section 11 from the post 13 and he will turn the knobs 28 of the lower section to permit the springs to thrust the lower plungers into the cups of the lower section, thus ejecting the completed spheres of molded material from the cups of the lower section. The frozen dainties thus molded then, preferably, will be placed in a suitable container or containers for dispensing to the customers. For example, a number of spheres can be placed in a single receptacle for sale to a single customer.

It may be desirable, in some instances, to provide a coating of a still different substance or substances as a finish for the surface of the frozen dainty and, in that event, such other substance or substances will be applied to the cups before the ice cream is placed in them. Thus, for example, a coating of ground nuts or a sugar syrup may be applied to the cups, and the ice cream then filled into the cups upon such coating.

I claim:

1. In an apparatus of the character described, the combination of separable mold sections having cups, plungers to eject the molded articles from the cups, and a perforate member provided at its margins with flanges and adapted to be placed on one of the sections when the sections are separated, the perforations of said member registering with the cups.

2. In an apparatus of the character described, the combination of separable mold sections having cups, means to hold the mold sections in spaced relation, plungers to eject the molded material from the cups of one section and press it upon the material in the cups of the other section, rotary means mounted on the first mentioned molding section and connected with the plungers to operate said plungers, and plungers to separate the molded articles from the cups of the second section.

3. In an apparatus of the character described, the combination of separable mold sections having cups, plungers to eject the molded articles from the cups, springs tending to force the plungers into the cups, and rotary means releasably holding the plungers retracted against the pressure exerted by the springs.

4. In an apparatus of the character described, the combination of separable mold sections having cups, plungers to eject the molded articles from the cups, an operating member connected with the plungers of each section, a shaft rotatably mounted on each operating member, followers mounted on the sections, and cams on the shafts engaging the followers.

5. In an apparatus of the character described, the combination of separable mold sections having cups, plungers to eject the molded articles from the cups, an operating member connected with the plungers of each section, a shaft rotatably mounted on each operating member, toothed followers mounted on the sections, and toothed cams on the shafts engaging the followers.

6. In an apparatus of the character described, the combination of separable mold sections having cups, plungers to eject the molded articles from the cups, springs tending to force the plungers out of the cups, an operating member connected with the plungers of each section, a shaft rotatably mounted on each operating member, and cam means operated by the shafts to move the operating members against the pressure of the springs to retract the plungers.

Signed at Los Angeles, California, this 12th day of October, 1922.

SAMUEL A. KORNSWEET.